Jan. 23, 1968   J. B. KOMENDERA   3,365,624
VALVE CONTROL SYSTEM
Filed Aug. 10, 1966   2 Sheets-Sheet 1
FIG. 1
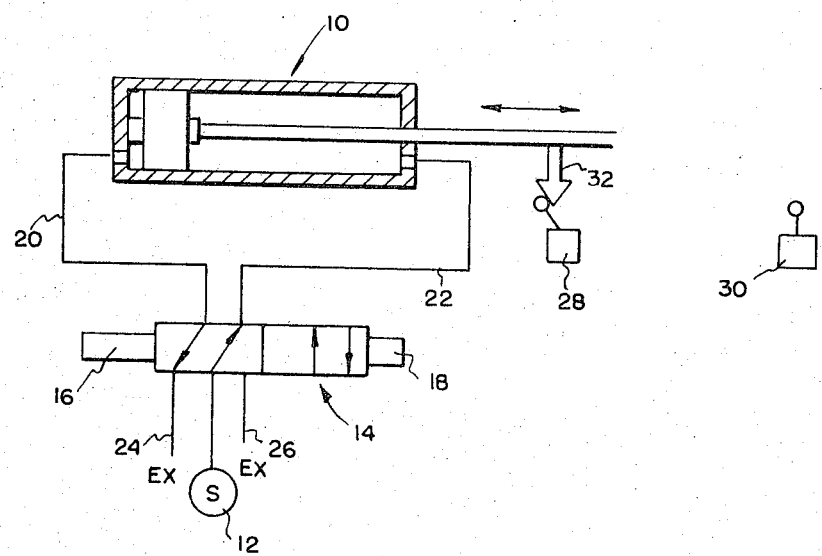
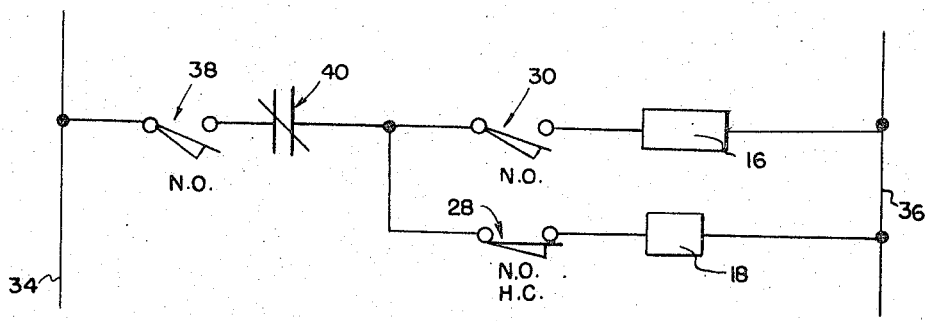
FIG. 2
INVENTOR
JEROME B. KOMENDERA
BY *Cullen, Sloman, & Cantor*
ATTORNEYS

United States Patent Office 3,365,624
Patented Jan. 23, 1968

3,365,624
VALVE CONTROL SYSTEM
Jerome B. Komendera, Bloomfield Hills, Mich., assignor to The Automatic Valve Corporation, Farmington, Mich.
Filed Aug. 10, 1966, Ser. No. 571,470
1 Claim. (Cl. 317—148.5)

ABSTRACT OF THE DISCLOSURE

An integrally packaged, limit switch-controlled, timer-solenoid valve operator provides adjustable dwell time for a fluid motor-operated cycling mechanism. The timer circuit comprises a solid state gated switching device, the gate of which is connected to a unijunction transistor, lying in the discharge path of an adjustable resistive-capacitive network.

---

This invention relates to controls for hydraulic and pneumatic actuating systems, and more particularly to an improved method of timing the opening and closing of control valves.

In the operation of machinery such as welders, presses, machine tools, injection molders, conveyors and automation equipment, control of the movement of various elements is frequently achieved by hydraulic or pneumatic cylinders. As such equipment becomes automated, the proper timing and sequencing of the various control valves becomes critical, so as to provide efficient and safe operation.

Accordingly, it is an object of this invention to provide means for both timing and operating pneumatic or hydraulic control valves.

It is a further object of this invention to provide a valve operator and timing circuit which is extremely accurate and reliable in operation and stable over a wide range of temperatures.

Still another object of this invention is to provide a valve timing and operating circuit which is readily adjustable over a wide range of timing intervals.

It is another object of this invention to provide a valve timing and actuating system which can be readily adapted to and added to existing valve systems.

It is still another object of this invention to provide a valve timing and actuating circuit having indicating means to monitor the operation and provide a visual display assuring proper operation of the valve.

These and other objects of this invention will become apparent from the following description, when considered in conjunction with the accompanying drawings.

In these drawings:

FIG. 1 is a schematic diagram of a typical system embodying the valve timing and control means of this invention.

FIG. 2 is a diagram of the circuitry employed with the system of FIG. 1.

Figure 3:
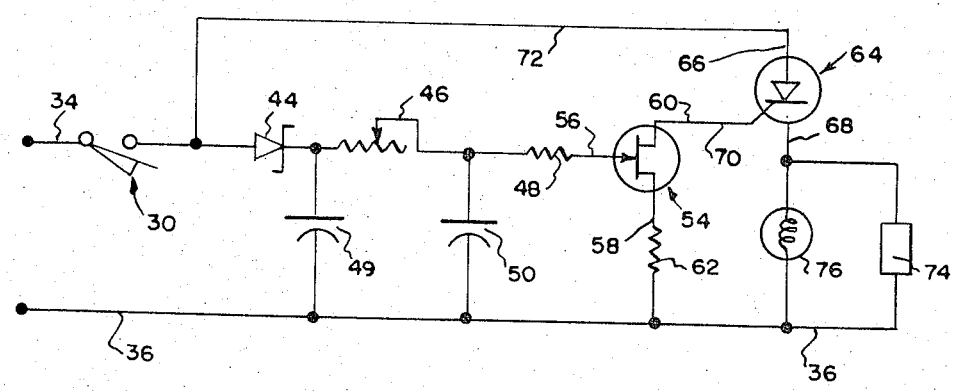
FIG. 3 is a schematic drawing of the timing portion of the circuit of FIG. 2.

Referring now to FIG. 1, there is illustrated a pneumatic or hydraulic cylinder 10 having a reciprocating piston mounted therein, the opposed faces of which are selectively exposed to either a source of pneumatic or hydraulic pressure 12 or to exhaust. Interposed between cylinder 10 and pressure source 12 is a four-way five port valve 14. Actuation of the valve is controlled by a timer solenoid 16 and solenoid 18. Fluid lines 20 and 22 connect valve 14 with the opposed faces of the piston in cylinder 10. Valve 14 is provided with two exhaust lines, 24 and 26. The operation of the valve will be described in further detail below.

Also illustrated in FIG. 1 are a pair of limit switches 28 and 30, which may be mounted at appropriate positions on the machine. These limit switches are actuated by a cam 32 carried by the reciprocating piston rod.

Referring now to FIG. 2, the control circuitry is mounted across lead lines 34 and 36, which are in turn connected to a source of alternating current. A normally open limit switch 38 might be typically employed as a machine interlock safety device. In series with switch 38 is a normally closed relay 40. Between relay 40 and lead line 36, timer solenoid 16 and its associated limit switch 30 are connected in parallel with solenoid 18 and its associated limit switch 28.

In FIG. 3 there is shown in detail the circuitry of timer-solenoid 16. The input from line 34 via switch 30 is connected to a series combination of a Zener diode 44, an adjustable resistance or potentiometer 46 and a fixed resistor 48. A filtering capacitor 49 is placed between the output of diode 44 and ground lead 36, to reduce the A.C. component of the rectified output of the diode. Between the junction of resistors 46 and 48 is a capacitor or condenser 50, the other lead of which is connected to return or ground lead 36.

The resistor 48 is also connected to the emitter lead 56 of a four layer diode 54, oftentimes referred to as a unijunction transistor, also having a first base lead 58 and a second base lead 60. Base lead 58 is connected to ground bus 36 via a suitable biasing resistor 62, while base lead 60 is connected to a gated solid state switching device such as silicon controlled rectifier 64 having anode 66, cathode 68 and gating terminal 70. The base lead 60 is directly connected to gating terminal 70. The anode is connected to input lead 34 via lead 72, and the cathode is connected to ground lead 36 through a parallel combination of winding 74 of timer-solenoid 16 and an indicator such as incandescent lamp 76.

The combination of R-C charging circuit and unijunction 54 constitutes a relaxation oscillator.

Operation

When the machine is ready for initiation of the particular cycle controlled by the system of FIG. 1, power will be applied to the circuit of FIG. 2 via interlock limit switch 38. Current will flow through relay 40 and limit switch 28 to solenoid 18, thus actuating the solenoid and shifting valve 14 out of the position illustrated in FIG. 1. The shifting of the valve will exhaust the right hand chamber of cylinder 10 via line 22 and exhaust line 26, and fluid pressure will be supplied to the left hand chamber of cylinder 10 from source 12 via line 20 to shift the piston rod to its right hand position. There cam 32 closes the normally open limit switch 30, to initiate the operation of the dwell-controlling timer circuit.

The timer operates in the following manner. Capacitor 50 is charged with half wave rectified direct current from input 34 through the now closed switch 30 to diode 44 and adjustable resistor 46. When the voltage across capacitor 50 rises to a predetermined level, the unijunction 54 emitter to base voltages are such that the transistor becomes conductive and supplies a positive gating pulse via lead 60 to SCR 64. This gating current is sufficient to render the SCR conductive, establishing a path from input 34 through lead 72, SCR 64, the parallel combination of solenoid winding 74 and lamp 76, and to ground 36.

The SCR will remain conductive, acting substantially as a short circuit from anode 66 to cathode 68 during the remainder of the positive half cycle from input 34. Once the source voltage reaches zero and begins the negative half cycle excursion, the SCR will, as will a conventional diode, block current flow from cathode to anode. The device is thus rendered non-conductive until the occurrence of another gating pulse from unijunction 54 during a positive voltage excursion of the source.

Thus, the current from input 34 flows through winding 74 of timer-solenoid 16. Conduction of unijunction 54 provides a discharge path for capacitor 50 through resistor 48, emitter 56, base 58, and resistor 62 to ground 36. Hence, capacitor 50 is enabled to charge again and commence a new cycle of operation.

It is evident that the period of the relaxation oscillator may be varied by adjusting the potentiometer 46. Thus, the point at which the oscillator gate signal is produced by transistor 54 may be very closely controlled and the phase of the supply current at which the SCR 64 fires and the average current to solenoid winding 74 may also be very precisely controlled. Further, the time between successive cycles of operation is dependent upon the choice of circuit parameters and may be varied over a wide range of values. Dwell time may be readily adjusted between .010 and 10 seconds for example, or other intervals as desired.

Current through SCR 64 supplies power to solenoid winding 74 and to incandescent lamp 76, providing a visual display which insures circuit operation as expected. In addition to a visual aid, the lamp energization may be sensed by a suitable photosensitive device which in conjunction with cooperating circuitry may provide a means for recording successful operation. The circuitry may monitor the number of firings, providing a check on the number of a particular operation performed, may monitor the duration of individual firings or provide a running total of operating time. Thus, the lamp or other type of indicator provides an invaluable means of monitoring system operation.

Thus, after termination of the pre-selected dwell time, solenoid 16 returns the piston of cylinder 10 to the left hand position. At this time, the control power is interrupted by relay 40, to prevent a repetition of the cycle. In this manner, continuous reciprocation of the piston is prevented, and a subsequent cycle is not initiated until interlock limit switch 38 once again indicates that the machine is ready for this portion of its cycle.

Figure 4:
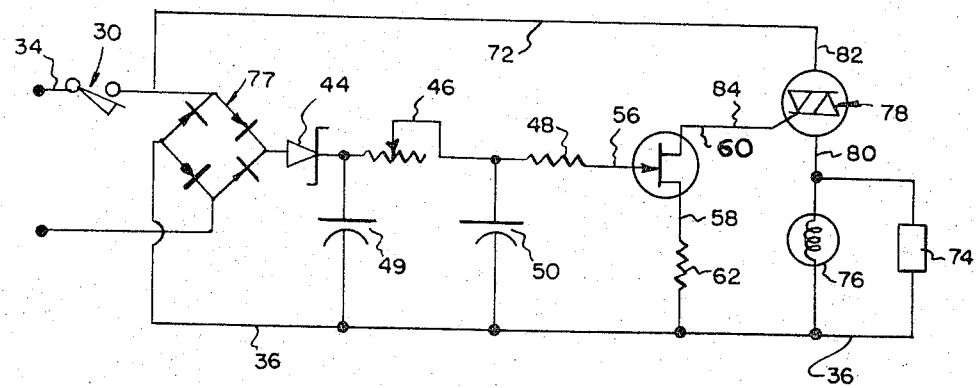
FIG. 4 is a diagram similar to FIG. 3, but illustrating a modified embodiment.

FIG. 4 illustrates an alternative embodiment of the invention with a bridge type rectifier 77 in series with diode 44, and with a Triac 78 substituted for the SCR 64. It is to be understood that either or both of these elements could be used in an alternative embodiment. Rectifier 77 is a conventional bridge type unit comprising four diodes which function to provide full wave rectification.

The Triac is a three lead gated A.C. power switching device, having first and second leads 80 and 82 and a third gating lead 84. As in the case of the SCR, switching is accomplished by a gate or control lead 84. The Triac however will conduct as long as a signal above a pre-calculated level is impressed on lead 84, and will pass current in proportion to the magnitude of the gate signal. Current will flow through this device in either direction, whereas SCR 64 passes current only from anode 66 to cathode 68.

Thus, a pulse derived from unijunction transistor 54 applied to gate lead 84 will render Triac 78 conductive for the duration of the pulse. Further versatility is available with the use of the Triac in that the pulse may be times to be available during either the positive or negative half cycle of the source or during both half cycles, that is, two pulses per cycle.

Diode 44 may be a Zener diode as shown, or conventional diode. The Zener diode will serve as a clipping and limiting device to further control the charging time of capacitor 50.

Further, the resistances shown may be replaced by thermistors, temperature variable resistance devices which may be placed in the circuit in such a manner as to compensate for changes in circuit parameters as a result of temperature changes, thereby providing increased temperature stability. The unijunction transistor 54 is stable over a wide range of temperatures, and is completely immune to the normally deleterious effect of heat generated by the solenoid coil. Thus an extremely reliable, precise and stable timing circuit has been disclosed.

To provide a controlled dwell time at each end of the stroke of cylinder 10, the circuit of FIG. 2 may be modified merely by a replacement of solenoid 18 with a timer solenoid identical with unit 16.

It can be seen that the system of this invention affords many advantages over existing costly and complex control panels. Conversion merely requires that standard solenoids be replaced by timer-solenoids of the type illustrated in FIG. 3. Only simple relay interlocks would be required for safety and reset purposes. Push buttons and/or limit switches would signal the machine cycle, and the timer-solenoid control would then program the entire operation sequence of the machine.

The cost and space required for control panels may thus be eliminated. The compact solenoid and entire R–C circuit may be conveniently housed in a single casting along with the valve to be controlled. Such a timer-solenoid could be readily employed with two position single and double solenoid poppet valves, or with two and three position single and double solenoid spool valves.

This invention may be further developed within the scope of the following claim. Accordingly, the above description is to be interpreted as illustrative of only two operative embodiments of this invention, rather than in a strictly limited sense.

I now claim:

1. A solenoid-controlled fluid operated cycling mechanism comprising:
   a fluid motor operatively connected to a source of fluid pressure and comprising a cylinder in which is mounted a piston for selective reciprocating movement;
   a control valve operatively connected between said fluid pressure source and said fluid motor for controlling the flow of fluid there between;
   a source of voltage;
   a single housing for enclosing a solenoid and solenoid timing circuit;
      said solenoid being operatively connected to said control valve for operating said control valve;
      limit switch means connected to said voltage source and said timing circuit, and located adjacent the respective ends of the stroke of said piston to signal the arrival of said piston at a predetermined position;
      said timing circuit comprising an adjustable resistive-capacitive network;
         said network being chargeable from said source of voltage upon the occurrence of a signal from said limit switch means;
         a discharge path connected to said network including a unijunction transistor;
         a solid state gated switching device, the gate terminal of which is connected to said transistor;

said switching device connected in a series with said solenoid and said series circuit combination of solenoid and switching device connected across said source;

whereby the dwell of said cycling mechanism in said predetermined position is determined by said timing circuit, and whereby said solenoid initiates the return of said mechanism from said predetermined position at the expiration of a predetermined dwell time.

References Cited
UNITED STATES PATENTS

| | | | |
|---|---|---|---|
| 2,529,777 | 11/1950 | McInnis | 91—275 |
| 2,735,405 | 2/1956 | Hipple | 91—275 |
| 2,851,014 | 9/1958 | Healy | 91—275 |
| 3,060,466 | 10/1962 | Kozacka | 91—275 |
| 3,225,541 | 12/1965 | Piret | 91—275 |

MILTON O. HIRSHFIELD, *Primary Eaminer.*

PAUL E. MASLOUSKY, *Examiner.*

J. A. SILVERMAN, *Assistant Examiner.*